Figure 1:
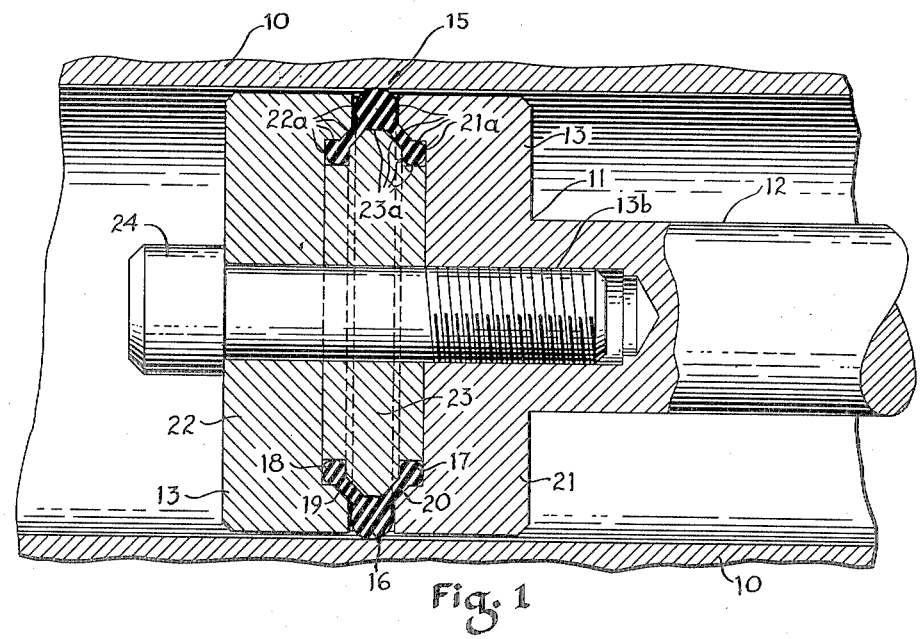

Nov. 13, 1956  J. E. COLLINS  2,770,510
PACKING MEANS FOR A PISTON
Filed May 25, 1954

INVENTOR.
John E. Collins
BY
Hyde, Meyer, Baldwin & Doran
ATTORNEYS 2,770,510
PACKING MEANS FOR A PISTON John E. Collins, Akron, Ohio Application May 25, 1954, Serial No. 432,194

13 Claims. (Cl. 309—4)

This invention relates to improvements in a packing means and more particularly to a packing means for a piston.

One of the objects of the present invention is to provide a packing means interlocked with one of two relatively movable members so as to provide sealing therebetween.

A further object of the present invention is to provide a packing means for a piston.

A further object of the present invention is to provide a generally V-shape packing means interlocked with one of two relatively movable members by generally conforming annular surfaces on said one member.

A further object of the present invention is to provide a packing means for a piston characterized by its structural simplicity, ease of assembly, operating efficiency, and economy of manufacture.

Other features of this invention reside in the arrangement and design of the parts for carrying out their appropriate functions.

Other objects and advantages of this invention will be apparent from the accompanying drawings and descriptions and the essential features will be set forth in the appended claims.

Figure 2:
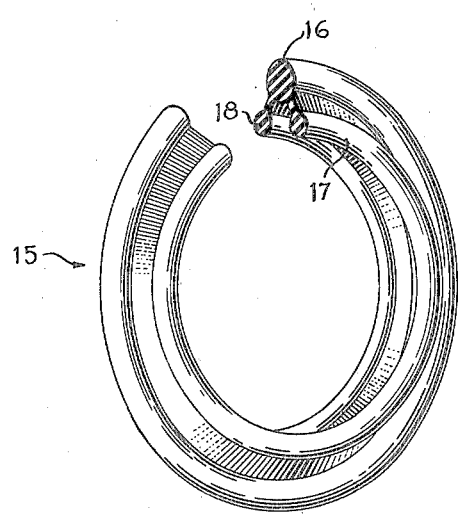

In the drawings,

Fig. 1 is a longitudinal sectional view through a cylinder and piston with said piston having a packing means in accordance with the present invention; while Fig. 2 is a perspective view, partially in section, of the packing means on the piston in Fig. 1.

Those familiar with this art will recognize that my invention may be applied in many ways, but I have chosen to illustrate the same in connection with coacting piston and cylinder members operable by any suitable fluid pressure wherein the fluid comprises air, oil, etc. However, it should be realized that this invention in its broader aspects includes the application of a packing means of this type to any members to provide a seal between this member and any other member wherein one member is movable relative to the other.

Fig. 1 discloses a piston member 11 reciprocably mounted in a cylinder member 10 to provide relatively movable inner and outer members between which a fluid seal is desired. The piston member 11 includes a stem or piston rod 12 and a piston head 13.

A dynamic seal is provided between these relatively movable members 10 and 11 by an annular packing means, generally shown at 15 in Figs. 1 and 2, formed of resilient material such as rubber, rubber-like material, or any other suitable resilient sealing material. This packing means 15 is generally V-shaped in transverse cross section while the enlargement at the outer periphery thereof makes the packing means 15 nearly approach a Y-shape. It is made up of a plurality of O-ring or annular portions 16, 17 and 18 with each located at the opposite ends of connecting webs or legs 19 and 20 of the V-shape. These webs 19, 20 are solid, annular webs so that no leakage can occur axially of the packing means 15 between the annular portions 16, 17, and 18.

The piston head 13 includes means for interlocking the packing means 15 therewith so that at least one of the O-ring portions bears against the bore of cylinder member 10. This means is formed in the present disclosure by having a plurality of axially aligned elements 21, 22 and 23 respectively with annular surfaces 21a, 22a and 23a generally conforming to the O-ring portions 16, 17 and 18 and the legs or webs 19 and 20 of the packing means 15. Hence, the packing means 15 is locked into and carried by the piston member 11 in a groove formed by the surfaces 21a, 22a and 23a. In the present disclosure, piston head 13 includes a cup-shaped piston face 21, a cup-shaped cap 22, and a disc 23 with the cup-shaped portions facing each other and housing the disc 23 of smaller diameter therebetween. These annular elements 21, 22 and 23 have annular surfaces 21a, 22a and 23a respectively thereon generally conforming to the O-ring portions 16, 17 and 18 and the legs 19 and 20 of the packing means 15 to provide the interlock therebetween. The packing means 15 has its legs 19 and 20 diverging in the inward direction toward the central longitudinal axis of the cylinder and piston 10, 11 with these legs straddling the peripheral surface 23a of the disc. It should be noted that the cross sectional diameter of each O-ring portion 16, 17 or 18 is larger than the thickness of the connecting legs or webs 19, 20 to provide the interlock therewith while the O-ring portion 16 bears in sealing relationship against the bore of this cylinder member 10.

Means is provided for pulling axially together the surfaces 21a, 22a and 23a on elements 21, 22 and 23 to lock therebetween the packing means 15 in proper position. This takes the form in the present disclosure of an axially extending bolt 24 screwed into threads 13b in the piston head for pulling the elements together when the bolt is tightened.

The advantages of this construction are several. First, it provides a mechanical lock between the packing means 15 and the piston member 12. Second, this mechanical lock is provided while still permitting the flexing advantages obtainable with an ordinary O-ring so as to always assure a good dynamic seal between the relatively moving surfaces. Third, if the piston member 12 passes through an open area wherein the packing ring 15 does not make contact with the bore wall of the cylinder member 10, the mechanical lock prevents a blow-out of the ring type sealing means 15 from its groove in the piston head 13.

It is contemplated that the present invention includes within its scope a wide range of inventive concepts besides the illustrated construction. The ring-type sealing means may be secured to or interlocked with any one of two relatively movable members, for example, the inner member 11 or the outer member 10. Also, the annular surfaces 21a, 22a, 23a, or their equivalents may be provided in the outer member to lock the packing means in place and to provide a portion of the bore of said outer member. Also, the packing means can take other shapes besides the V or Y-shape illustrated, and then the interlock could still be provided by detachably engaging an anchoring portion of any shape, such as at least one of the O-ring portions and a connecting web. Also, the packing means may have a cross section of inverted form with the legs diverging outwardly or may have other shapes besides the V-shape so as to provide a sealing function by other O-ring portions beside the O-ring portion 16 in Fig. 1. However, the illustrated construction is the preferred construction.

Various changes in details and arrangement of parts can be made by one skilled in the art without departing from either the spirit of this invention or the scope of the appended claims.

What I claim is:

1. In combination, inner and outer relatively movable members, a generally annular packing means carried by one of said members, said annular packing having a cross-section including displaced O-ring portions and having a connecting web extending between the O-ring portions, the diameter of each O-ring portion in cross section being larger than the thickness of said web, and means on said one member to interlock one of the O-ring portions therewith with said other O-ring portion bearing against said other member in sealing relationship.

2. In combination, inner and outer relatively movable members, a generally V-shaped annular packing means carried by one of said members and having O-ring portions at the opposite ends of each leg with the diameter of each O-ring portion in cross section being larger than the thickness of its connecting leg, said one member including a plurality of axially aligned elements having annular surfaces generally conforming to said V-shaped packing means, and means to pull the surfaces and elements together to lock therebetween said packing means in position.

3. In combination, a cylinder member, a piston member relatively movable therein, a generally V-shaped annular packing means carried by said piston member, said piston member including a cup shaped piston face and a cup shaped cap facing each other with a disc of smaller diameter therebetween, said packing means having its legs diverging in the inward direction and straddling the periphery of said disc, the vertex of the V-shape having an annular portion forming a dynamic seal with said cylinder member, said cup shapes having surfaces closely straddling said annular portion outwardly to within a small clearance from said cylinder member, and means for pulling together said piston face, cap and disc to lock said packing means therebetween.

4. In combination, a cylinder member, a piston member relatively movable therein, a generally V-shaped annular packing means carried by said piston member and having an O-ring portion at the opposite ends of each leg with the diameter of each O-ring portion in cross section being larger than the thickness of its connecting leg, said piston member including a cup shaped piston face and a cup shaped cap facing each other with a disc of smaller diameter therebetween with each having annular surfaces generally conforming to the O-ring portions and legs of said V-shaped packing means, said packing means having its legs diverging in the inward direction and straddling the periphery of said disc, and an axially extending bolt for pulling together said piston face, cap and disc to lock said packing means therebetween.

5. In combination, inner and outer relatively movable members, one of said members having a groove, and a generally V-shaped annular packing means carried by said one of said members in the groove therein, one end of said V-shape having a surface when unstressed arcuate in cross section transverse to the circular periphery of said packing means with said surface engageable with the other of said members to form a dynamic seal therewith.

6. In combination, inner and outer relatively movable members, and a generally V-shaped annular packing means carried by one of said members, the diverging legs of said V-shape interlocking with said one member to be carried thereby, said packing means having an annular surface forming a dynamic seal with the other of said members, said surface having an axial extent substantially less than the inner spread between the legs of the V-shape.

7. In combination, inner and outer relatively movable members, one of said members having a groove, and a generally V-shaped annular packing means carried by said one of said members in the groove therein, one end of said V-shape having an annular O-ring portion thereon forming a dynamic seal with the other of said members.

8. In combination, inner and outer relatively movable members, one of said members having a groove and a generally V-shaped annular packing means carried by said one of said members in the groove therein, said one member having generally parallel surfaces forming said groove and straddling an annular portion of said packing means forming a dynamic seal with the other of said members.

9. In combination, a cylinder member, a piston member relatively movable therein, and a generally V-shaped annular packing means carried by said piston member, one end of said V-shape having a surface when unstressed arcuate in cross section transverse to the circular periphery of said packing means with said surface engageable with the cylinder member to form a dynamic seal therewith.

10. In combination, a cylinder member, a piston member relatively movable therein, and a generally V-shaped annular packing means carried by said piston member, said packing means having an annular surface forming a dynamic seal with the cylinder member, said surface having an axial extent substantially less than the overall axial spread of the legs of the V-shape.

11. In combination, a cylinder member, a piston member relatively movable therein, and a generally V-shaped annular packing means carried by said piston member, one end of said V-shape having an annular O-ring portion thereon forming a dynamic seal with the cylinder member.

12. In combination, a cylinder member, a piston member relatively movable therein, and a generally V-shaped annular packing means carried by said piston member, one end of said V-shape having an annular O-ring portion thereon forming a dynamic seal with the cylinder member, said piston member having generally parallel surfaces straddling said O-ring portion with said portion having an axial extent substantially less than the inner spread between the legs of the V-shape.

13. In the combination set forth in claim 3, said surfaces are generally parallel and extend generally transverse to the direction of movement of said members, and said annular portion is circular in cross section like an O-ring.

References Cited in the file of this patent
UNITED STATES PATENTS

| | | |
|---|---|---|
| 1,840,880 | Black | Jan. 12, 1932 |
| 2,022,599 | Leuschner | Nov. 26, 1935 |
| 2,042,078 | Suhm et al. | May 26, 1936 |
| 2,092,087 | Saharoff | Sept. 7, 1937 |
| 2,163,162 | Wells | June 20, 1939 |
| 2,364,823 | Schnell | Dec. 12, 1944 |